United States Patent [19]

Ohnishi et al.

[11] Patent Number: 5,089,906
[45] Date of Patent: Feb. 18, 1992

[54] SUPERTWISTED NEMATIC LIQUID CRYSTAL DEVICE HAVING TWO PHASE DIFFERENCE PLATES FOR PROVIDING BLACK/WHITE DISPLAY

[75] Inventors: Hiroshi Ohnishi, Nara; Toshiyuki Yoshimizu, Kyoto; Masakazu Wada; Hiroshi Kuwagaki, both of Nara; Toshimichi Katsube, Yamatokoriyama, all of Japan

[73] Assignee: Sharp Kabushiki Kaisha, Osaka, Japan

[21] Appl. No.: 475,901

[22] Filed: Feb. 6, 1990

[30] Foreign Application Priority Data

| Feb. 6, 1989 | [JP] | Japan | 1-28387 |
| Mar. 24, 1989 | [JP] | Japan | 1-72150 |
| Apr. 29, 1989 | [JP] | Japan | 1-110090 |
| Oct. 6, 1989 | [JP] | Japan | 1-262624 |

[51] Int. Cl.$^5$ ............................................. G02F 1/13
[52] U.S. Cl. ......................................... 359/73; 359/63; 359/102
[58] Field of Search ............... 350/334, 337, 347 R, 350/347 E, 339 R

[56] References Cited

U.S. PATENT DOCUMENTS

| 4,852,976 | 8/1989 | Suzuki | 350/339 R |
| 4,909,606 | 3/1990 | Wada et al. | 350/347 R |
| 4,941,737 | 7/1990 | Kimura | 350/347 E X |
| 4,952,029 | 8/1990 | Hayashi et al. | 350/347 E X |

FOREIGN PATENT DOCUMENTS 64-519  1/1989  Japan .

Primary Examiner—Stanley D. Miller
Assistant Examiner—Huy K. Mai

[57] ABSTRACT

The invention relates to a liquid crystal display device wherein phase difference plates equal in retardation value, being composed of uniaxial polymer film or the like, are disposed symmetrically at the front side and back side of an STN liquid crystal panel, and the wavelength dispersion is made nearly ideal. As a result, the phase difference is compensated over the entire wavelength region, and the azimuth angles of the exit ellipsoidal polarization are aligned. Thus, a colorless display and a high contrast may be realized at the same time.

7 Claims, 16 Drawing Sheets

Fig.15 (a)  Fig.15 (b)
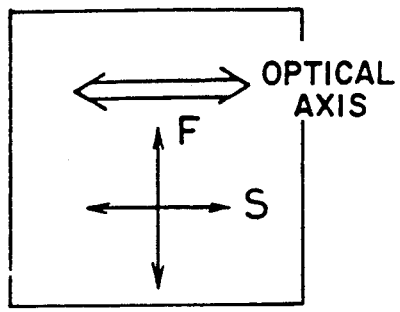 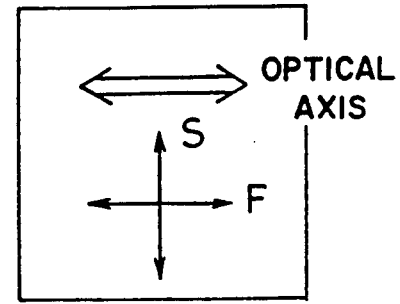
(a) POSITIVE    (b) NEGATIVE
Fig.16
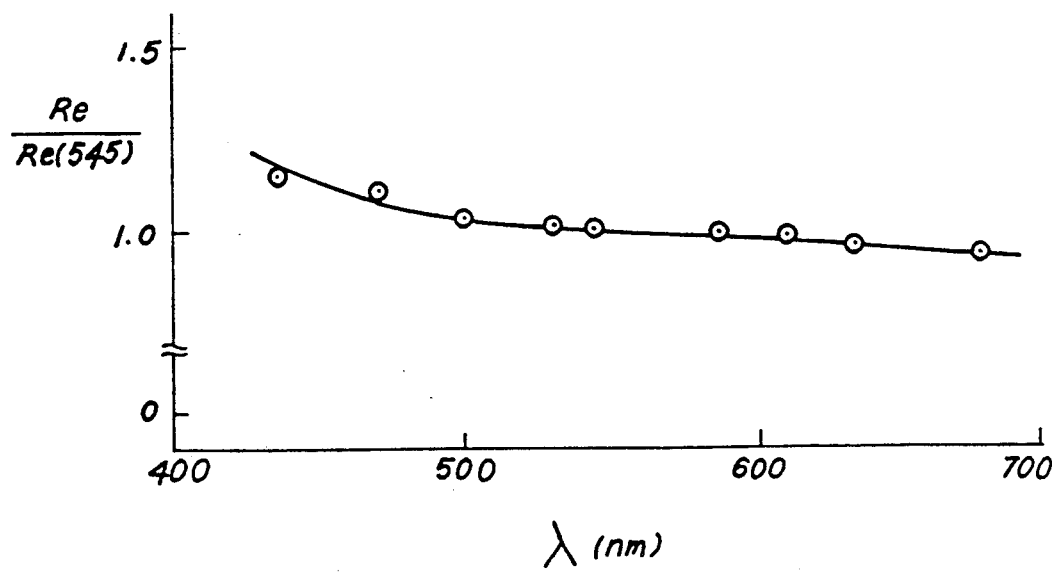

SUPERTWISTED NEMATIC LIQUID CRYSTAL DEVICE HAVING TWO PHASE DIFFERENCE PLATES FOR PROVIDING BLACK/WHITE DISPLAY

BACKGROUND OF THE INVENTION

1. Field of the Invention

The present invention relates to a liquid crystal display device having color compensation in a supertwisted liquid crystal.

In this specification, a phase difference plate means a retardation plate or a birefringence plate.

2. Description of the Prior Art

Generally, a supertwisted nematic liquid crystal display device (STN-LCD) is colored in yellow-green or blue, but a bright and sharp black/white display is obtained by using a color correction plate. As a result, the display quality is enhanced. Further, it may be used in the word processor, computer and other automated equipment.

In such a color-compensated two-layer STN-LCD, the coloration produced in the first layer (the cell for driving) is corrected in the second layer (the cell for optical compensation) to turn into a colorless display. This structure requires two liquid crystal cells, as compared with the single-layer STN-LCD, and the thickness and weight of the display device are increased.

On the other hand, in the phase difference plate type STN-LCD, it is known to dispose a phase difference plate before the liquid crystal cell, and to dispose one plate, each at the front side and back side of the liquid crystal cell. However, as compared with the two-layer type STN-LCD, the contrast is inferior and a sufficient display quality is not obtained (for example, the Japanese Laid-open Patent 64-519).

According to the Japanese Laid-open Patent 64-519, phase difference plates are disposed at the front side and back side of the STN liquid crystal panel. In its Embodiment 21, the sum of retardations of the two is about 0.6 μm (600 nm). However, nothing is mentioned about the individual values. Incidentally, when the present inventors attempted to dispose the 300 nm phase difference plates in the system disclosed in Embodiment 21, a satisfactory black/white display was not obtained.

A phase difference plate is also called a retardation plate or a birefringence plate.

SUMMARY OF THE INVENTION

It is hence a primary object of the invention to solve the problems of the above-mentioned method, and to present a liquid crystal display device capable of obtaining a sharp black/white display in comparison with the existing phase difference plate type STN-LCD, while being smaller in thickness and weight as compared with the two-layer STN-LCD.

To achieve this object, the present invention features a structure wherein phase difference plates made of a uniaxial polymer film or the like, and equal in retardation value, are disposed symmetrically at the front side and back side of the STN liquid crystal panel in order to compensate for the phase difference caused in the STN liquid crystal panel.

That is, the invention presents a liquid crystal display device, relating to a supertwisted nematic liquid crystal display device, composed by sequentially laminating an upper polarizer plate, a first phase difference plate, an STN liquid crystal panel, a second phase difference plate, and a lower polarizer plate, wherein the retardation values of the first phase difference plate and the second phase difference plate are equal to each other, and the first phase difference plate and the second phase difference plate are symmetrically disposed with respect to the STN liquid crystal panel, in the relation of $\theta_1 + \theta_2 = 180°$. In this specification, $\theta_1$ is the angle formed by the liquid crystal molecular orientation axis of the upper substrate composing the STN liquid crystal panel and the optical axis of the first phase difference plate, and $\theta_2$ is the angle formed by the liquid crystal molecular orientation axis of the lower substrate composing the STN liquid crystal panel and the optical axis of the second phase difference plate.

In a preferred embodiment, the retardation values of the first phase difference plate and the second phase difference plate are preferably 330 to 500 nm, or more preferably 330 to 420 nm.

In another preferred embodiment, both $\theta_1$ and $\theta_2$ are greater than 45°.

In another preferred embodiment, both $\theta_1$ and $\theta_2$ are 90°.

In a further preferred embodiment, the first phase difference plate and the second phase difference plate are respectively composed of a single or plural uniaxial polymer film.

In a further different preferred embodiment, relating to a liquid crystal display device using an STN liquid crystal panel with a known twist angle and retardation value, supposing the retardation values of the first phase difference plate and the second phase difference plate to be Re1 individually, the effective retardation values due to the first phase difference plate and the second phase difference plate to be Re2, and the angle formed by the optical axes of the first phase difference plate and the second phase difference plate to be $\theta$, from the graph showing the correlation of Re (panel) and Re1, an approximate value of Re1 is selected, and from $$nRe2 = Re\ (panel) \times 3/2\ (n = 1\ or\ 2),$$

an approximate value of Re2 is calculated. Further, from $$Re2 = 2Re1\cos\theta,$$

an approximate value of $\theta$ is calculated. Accordingly the first phase difference plate and the second phase difference plate are disposed.

According to the invention, since phase difference plates equal in retardation value made of uniaxial polymer film or the like are symmetrically disposed at the front side and back side of the STN liquid crystal panel, the wavelength dispersion may be closer to the ideal profile than in the conventional phase difference plate type STN-LCD (Embodiment 21 of the Japanese Laid-Open Patent 64-519). As a result, in the whole wavelength region, the phase difference is compensated, and the azimuth angles of the exit ellipsoidal polarization are aligned. Thus, a colorless display and a high contrast may be achieved at the same time, by the optimum setting of the analyzer.

Also by this invention, the thickness and weight can be reduced from the existing two-layer type STN-LCD. Further, the contrast ratio is higher.

In order to obtain the contrast higher than in the two-layer type STN-LCD and also a sharp black/white display high in transmittance in ON mode, it is desired, as practically shown in Embodiments 1 to 5 later, to use the phase difference plates having the retardation values of 330 to 500 nm, or more preferably 330 to 420 nm.

Moreover, according to the invention, once the twist angle of the STN liquid crystal panel and its retardation value Re (panel) are determined, the retardation value Re1 of the phase difference plates to be used, and the angle θ formed by the optical axes of the first and second phase difference plates may be approximately obtained. Thus, the optical design may be easily planned, and the production efficiency may be enhanced.

BRIEF DESCRIPTION OF THE DRAWINGS

The objects, features and advantages of the invention will be better understood and appreciated from the following detailed description taken in conjunction with the drawings, in which:

FIG. 15 is a drawing showing the relation of optical axes of the phase difference plates;

FIG. 16 is a diagram showing the wavelength dispersion of the phase difference plates;

DETAILED DESCRIPTION OF THE PREFERRED EMBODIMENTS

Figure 1:
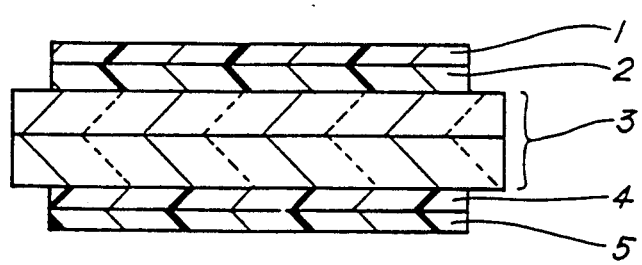
FIG. 1 is a structural explanatory drawing of a liquid crystal display device presented for explanation of an embodiment of the invention.

Referring now to the drawings, some of the preferred embodiments of the invention are described in detail below.

EMBODIMENTS

The present inventors, as a result of a number of studies with the aims of heightening the transmittance in the ON state and lowering the transmittance in the OFF state, discovered that the optimum conditions are to keep the retardation value of the phase difference plates in a range of 330 to 420 nm, and to dispose those of the same value symmetrically at the front side and the back side. The inventors also discovered a rule of approximating the setting conditions from the retardation values of the STN liquid crystal panel. This is explained below.

Figure 10:
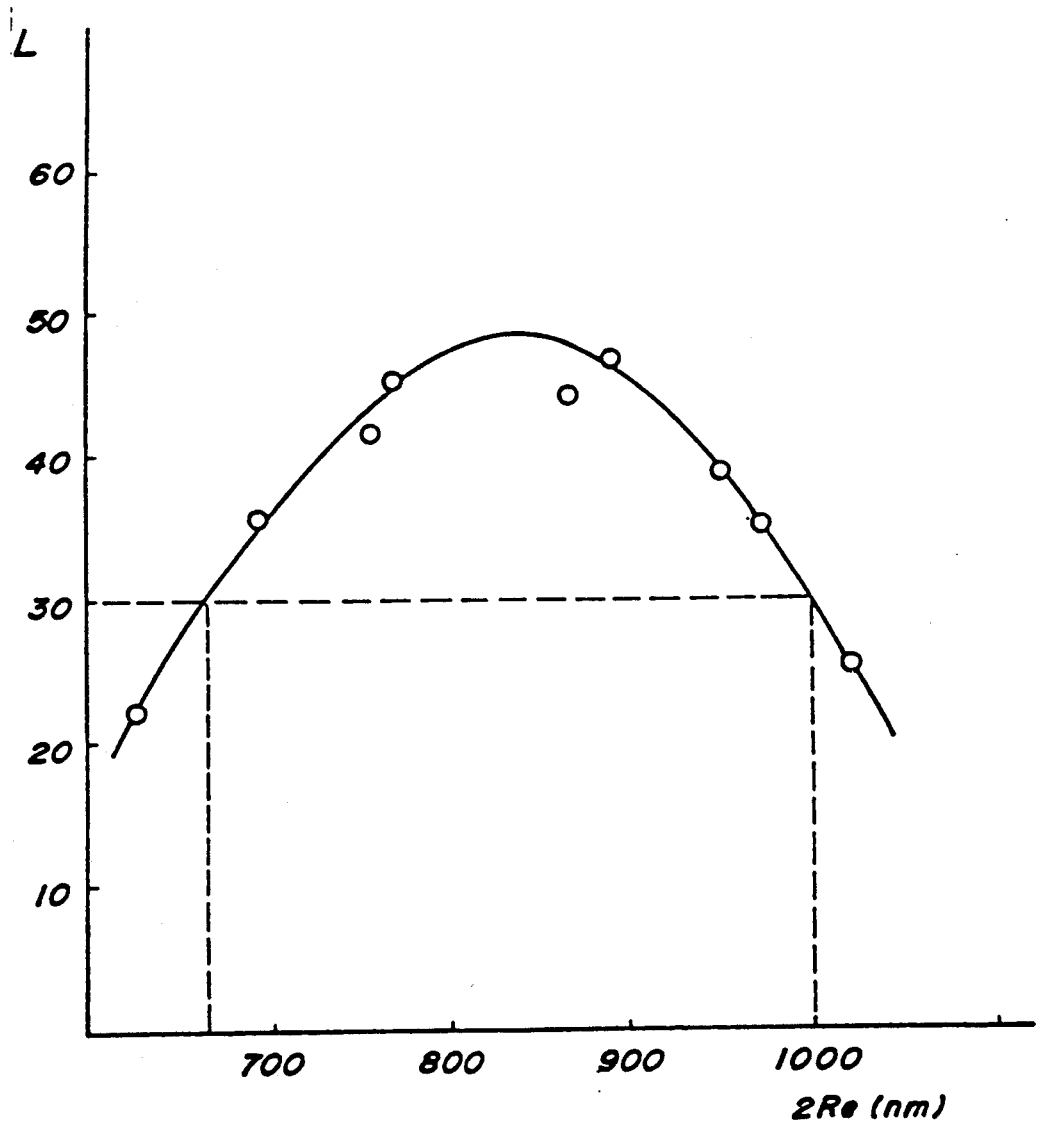
FIG. 10 is a diagram showing the relation between the retardation value and brightness (L-value) when two phase difference plates having the same retardation value are joined together.

In the first place, to keep the brightness of display as the liquid crystal display device, the retardation values of the phase difference plates to be disposed must be taken into consideration. In FIG. 10 (where L-value=100 is displayed as white, and L-value=0 as black), under the practical limitation of the L-value as the unit for expressing the brightness to be 30 or more, the sum 2Re (nm) of retardation values of two phase difference plates should be 660 nm to 1000 nm (the values indicated by dotted line in FIG. 10). That is, the retardation value of one phase difference plate should be 330 nm to 500 nm in order to obtain a sufficient brightness, according to the discovery by the present inventors. Therefore, the range of the retardation value of the phase difference plate from 330 to 420 nm is the optimum condition included in this requirement.

Meanwhile, the retardation value Re1 of one phase difference plate and the angle θ formed by the optical axes of the first and second phase difference plates at this time may be approximated on the basis of the retardation value d.Δn = Re (panel) of the STN liquid crystal panel in the following manner.

Figure 11:
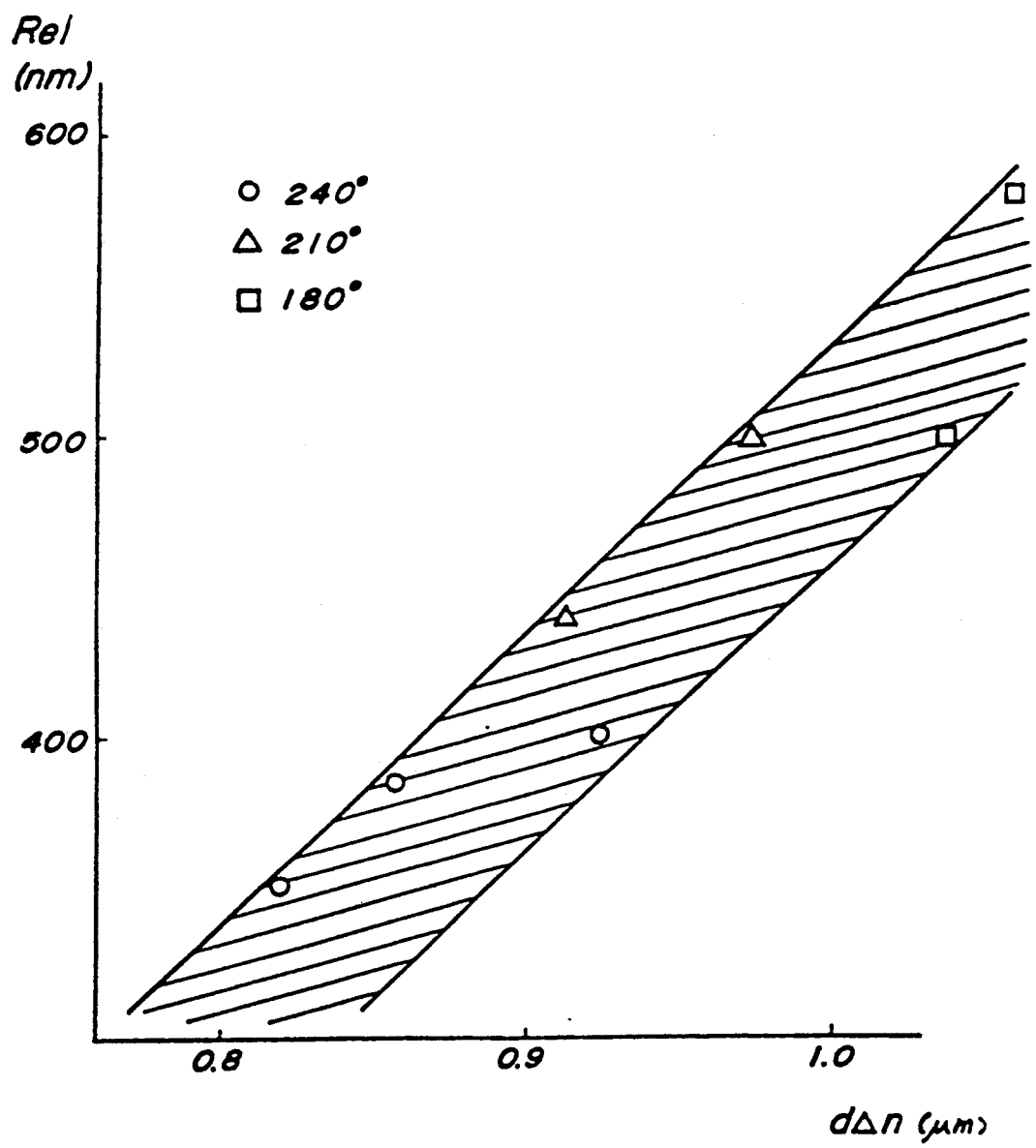
FIG. 11 is a diagram showing the relation between the retardation value d.Δn of the STN liquid crystal panel and the retardation value Re2 of the phase difference plate being used.

FIG. 11 is a diagram showing the relation between the retardation value d.Δn of the liquid crystal panel and the retardation value Re1 of the phase difference plate to be used, in which the o-mark indicates the experimental value at a twist angle of 240 degrees, the Δ-mark denotes the experimental value at a twist angle of 210 degrees, and the □-mark shows the experimental value at a twist angle of 180 degrees, and the correlation is observed in the shaded area. From the relation (shaded area) shown in FIG. 11, the approximate value Re1 of the retardation of the phase difference plate to be used may be selected.

Figure 12:
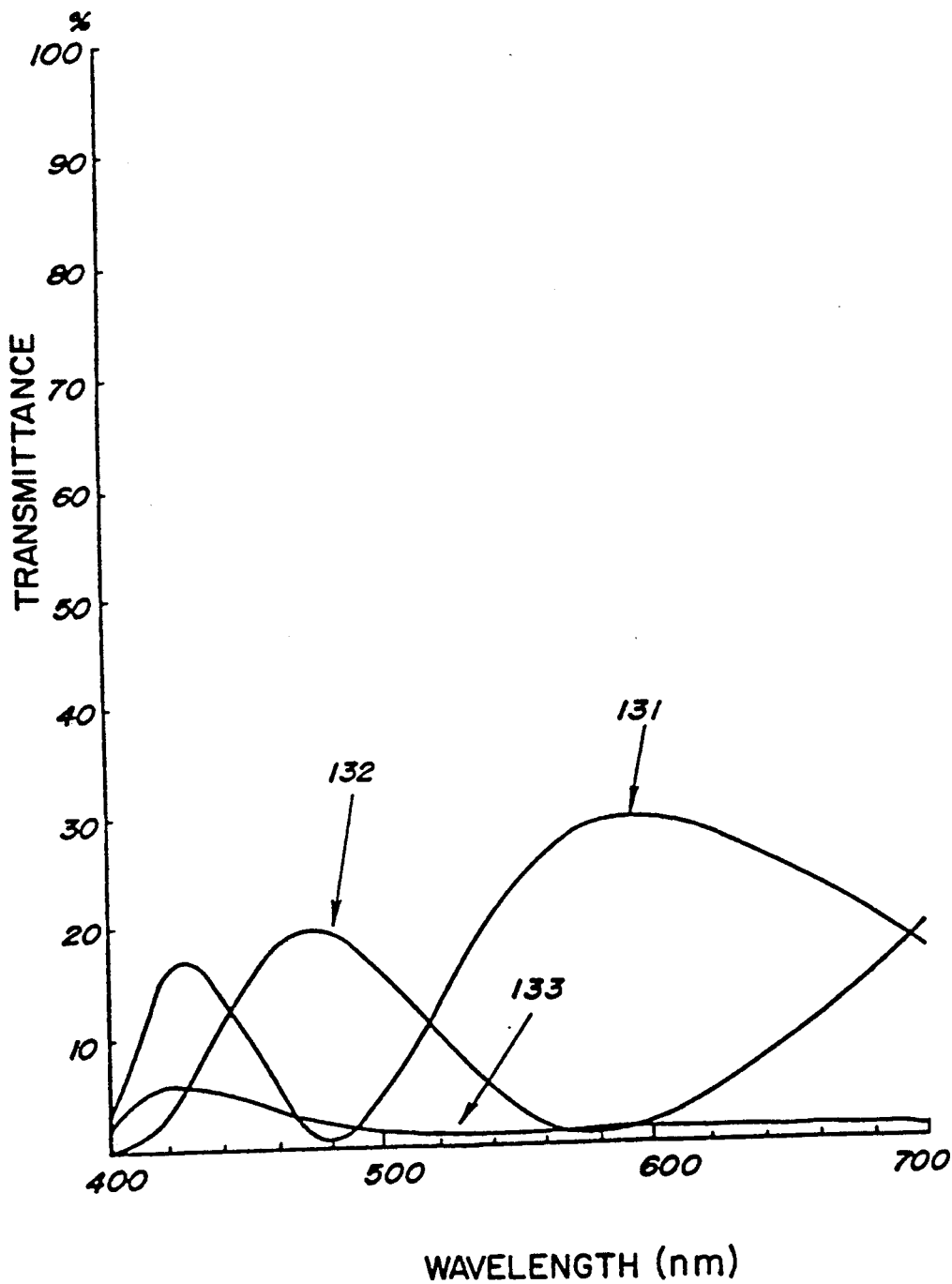
FIG. 12 is a diagram showing the relation of the spectral transmittance between the STN liquid crystal panel and the phase difference plate.

FIG. 12 is an actual measurement diagram showing the relation of the spectral transmittance between the STN liquid crystal panel and phase difference plate in a certain embodiment, presenting the measured values in the parallel Nicol state.

Generally when a double refractive element is placed between parallel Nicols, the formula for expressing the transmission light intensity is $T = \sin 2\gamma \times \cos^2(\pi R/\lambda)$, where the angle γ is the angle formed by the optical axis and polarization axis, and R is the retardation value.

When sin2γ≠0, that is, 2Y≠0, π, the maximum value of the transmitted light is obtained when $\cos^2(\pi R/\lambda)=1$, that is, $(\pi R/\lambda)=n\pi$, or $R=\lambda(n=1)$. It means that the retardation value of the double refractive element is expressed as the wavelength when the maximum value of transmitted light is given. On the other hand, the minimum value of transmitted light is obtained when $\cos^2 (\pi R/\lambda)=0$, that is, $(\pi R/\lambda)=\pi/2+n\pi$, or $R=3/2(n=1)$. Therefore, the spectral transmittance curve of the double refractive element having the retardation value of 3R/2 is in inverse relation to the spectral transmittance curve of the double refractive element having the retardation value of R, with respect to the maximum and minimum values of the transmitted light.

In FIG. 12, numeral 131 shows a spectral transmittance curve of the STN liquid crystal panel, 132 is a spectral transmittance curve when the first and second phase difference plates are overlaid at an optical axis angle of θ, and 133 is a spectral transmittance curve when the STN liquid crystal panel and phase difference plates are disposed almost optimally. The curve 131 reaches the first minimum value at nearly 480 nm, and shows the maximum value nearly at 595 nm. On the other hand, the curve 132 hits the minimum value nearly at 590 nm, and reaches the maximum nearly at 885 nm (not shown). These maximum values correspond to the retardation value Re (panel) of the STN liquid crystal panel and the effective retardation value Re2 of the phase difference plate. Further, when a flat and low transmittance state is obtained as indicated by the spectral transmittance curve 133, a relation of inverting the wavelengths of the maximum value and minimum value of transmittance exists between Re2 and Re (panel) therefore, the above formula of Re (panel) x 3/2=nRe2 (n=1 or 2) is obtained.

Therefore, from the retardation value Re (panel) of the STN liquid crystal panel, the effective retardation value Re2 obtained by the sum of the first and second phase difference plates may be determined.

In an example in FIG. 12, the maximum value of the spectral transmittance curve 131 of the liquid crystal panel is at 595 nm, and the retardation value of the liquid crystal panel is Re (panel)=595 nm. The effective retardation value obtained when two phase difference plates are joined is, from the above formula Re (panel)×3/2=nRe2 (n=1 or 2), Re2=595×3/2=892.5 nm (n=1). This is approximate to the actually measured value of 885 nm in the curve 132.

Figure 13:
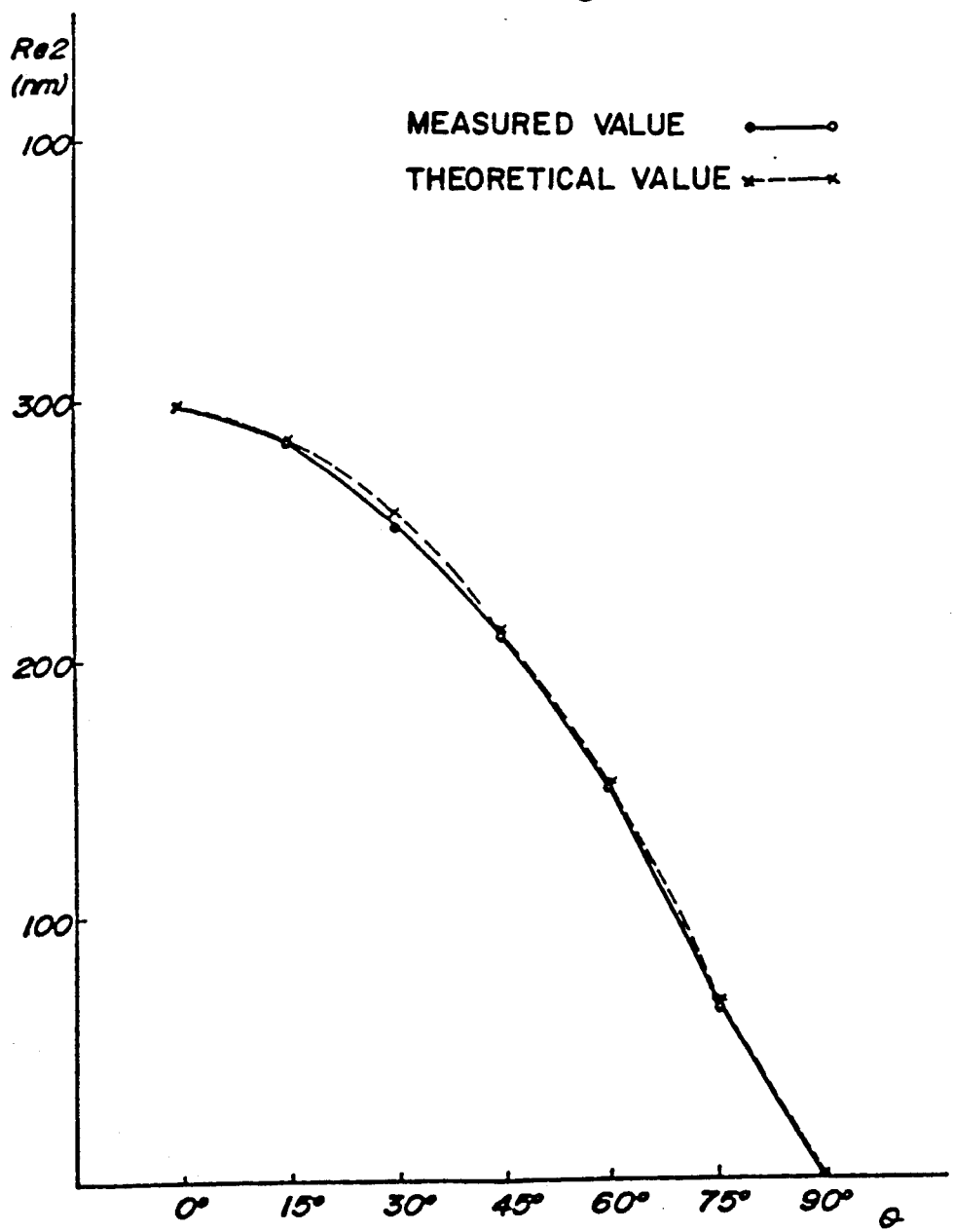
FIG. 13 is a diagram showing the relation between the angle θ formed by the optical axes of the first and second phase difference plates and the effective retardation value produced by the first and second phase difference plates.

On the other hand, FIG. 13 is a diagram showing the relation between the angle θ formed by the optical axes of the first and second phase difference plates, and the effective retardation value achieved by the first and second phase difference plates. In FIG. 13, the solid line indicated by the o-mark denotes the measured values, and the dotted line shown by the x-mark refers to the theoretical value assuming Re2=Re1cosθ+Re1cosθ=2Re1cosθ. It is found that the measured values and therorectical values coincide very well with each other.

Therefore, since the effective retardation value Re2 obtained by the sum of the first and second phase difference plates and the retardation value Re1 of each phase difference plate are obtained as stated above, the angle θ formed by the optical axes of the first and second phase difference plates may be approximated from Re2=2Re1cosθ. Eventually the twist angle and the retardation value of the STN liquid crystal panel are obtained, the retardation value of the using phase difference plate and the angle θ formed by the optical axes of the first and second phase difference plates may be approximated.

In thus determined conditions, in the OFF state, the front phase difference plate is emitted as a slender ellipsoidal polarization (nearly linear polarization) aligned in the azimuth angles of rays of three wavelengths of R, G, B. Further, in the ON state, the front phase difference plate is emitted as an ellipsoidal polarization (nearly circular polarization) large in the ellipticity, relatively aligned in the azimuth angle of rays of three wavelengths of R, G, B. Therefore, the color compensation is achieved and a high contrast is obtained by optimizing the configuration of the analyzer.

To be more specific, however, the rotation dispersion due to the supertwisted liquid crystal layer is added, and hence the retardation value of the phase difference plates and the angle θ formed by the optical axes of the first and second phase difference plates must be somewhat adjusted from the approximate values obtained above. However, this is generally effective as the technique for optimization.

Hereinafter the action of this structure is explained, on the basis of the optical principle, from the viewpoints of the wavelength dispersion of retardation value (merely called wavelength dispersion below) of the phase difference plates and STN liquid crystal panel, and the phase decreasing action of the phase difference.

Relating to the phase difference plates, the relation of the optical axes and the wavelength dispersion are described in the first place. The phase difference plates for compensation of the phase difference of the STN liquid crystal panel are made of polycarbonate, polyvinyl alcohol or the like, and are provided with a specific phase difference (retardation) in the drawing process of manufacture. Crystallo-optically, the material has a property similar to a uniaxial crystal. The relation of the optical axes of these phase difference plates may be considered in two different ways as shown in FIG. 15 (a), (b), assuming the oscillating direction of the light wave at maximum velocity of the incident light to be the phase advancing axis (F-axis or X'-axis), and the oscillating direction of the light wave at minimum velocity to be phase delaying axis (S-axis or Z'-axis). For example, polycarbonate is positive in (a), and polymethyl methacrylate is negative in (b). In any case, the materials may be handled alike once the phase advancing axis and phase delaying axis are known.

Concerning the wavelength dispersion, it was obtained as the phase difference to each wavelength by the analysis of ellipsoidal polarization obtained by actually entering linear polarization of monochromatic light into the phase difference plate. An example of the thus obtained wavelength dispersion is shown in FIG. 16.

Figure 17:
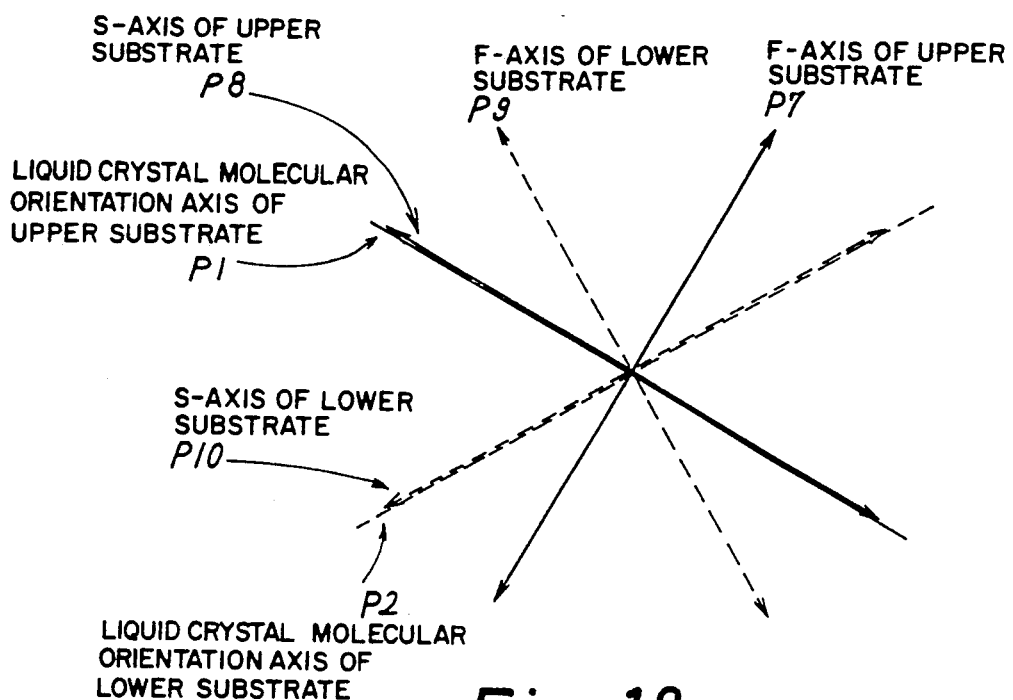
FIG. 17 is a drawing showing the relation of the optical axis of the STN liquid crystal panel.

The relation of the optical axes of the STN liquid crystal panel may be considered as shown in FIG. 17, from the optical properties of the liquid crystal molecules, assuming the direction of the minor axis of the liquid crystal molecule on the F-axis and the direction of the major axis on the S-axis, seeing that both upper and lower substrates are defined in the orientation of liquid crystal molecules by the rubbing method. In FIG. 17, P1 is the liquid crystal molecular orientation axis of the upper substrate, P2 is the liquid crystal molecular orientation axis of the lower substrate, P7 is the F-axis of the upper substrate, P8 is the S-axis of the upper substrate, and P10 is the S-axis of the lower substrate.

On the other hand, concerning the wavelength dispersion, the wavelength dispersion of Δn of the liquid crystal material itself. Further, the rotary dispersion due to the supertwisted liquid crystal layer are added, and the wavelength dispersion cannot be directly obtained from the analysis of the exit ellipsoidal polarization. Accordingly, (1) using a homogeneously oriented liquid crystal panel, the wavelength dispersion of the retardation value was determined (not being twisted at this time, there is no rotary dispersion, so that it may be possible to measure the same as being in the phase difference plate), and (2) determining the rotary dispersion on the STN liquid crystal panel, the wavelength dispersion of the STN liquid crystal panel was approximately obtained as the composition of (1) and (2). However, the measurement of (2) was achieved by entering the linear polarization of monochromatic light parallel to the liquid crystal molecular orientation direction (that is, S-axis) of the input side substrate of the STN liquid crystal panel, and obtaining the azimuth angle of the exit ellipsoidal polarization at this time as the angle of rotation.

Figure 18:
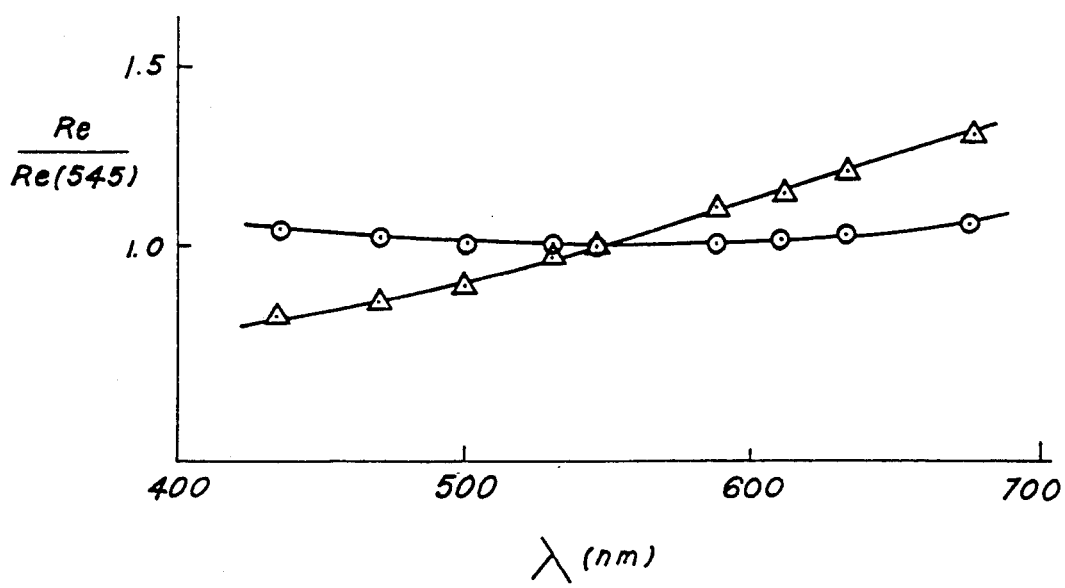
FIG. 18 is a diagram showing the wavelength dispersion of the STN liquid crystal panel.

Actually, by applying OFF voltage and ON voltage to the STN liquid crystal panel, the wavelength dispersion was obtained. The result is shown in FIG. 18. The STN liquid crystal panel appears to be colored because the exit light, before entering the analyzer, is an ellipsoidal polarization differing in the azimuth angle in each wavelength due to the characteristic shown in FIG. 18. Therefore, to eliminate this coloration, the phase different may be decreased to return to linear polarization, or an ellipsoidal polarization aligned in the azimuth angle may be formed.

Figure 2:
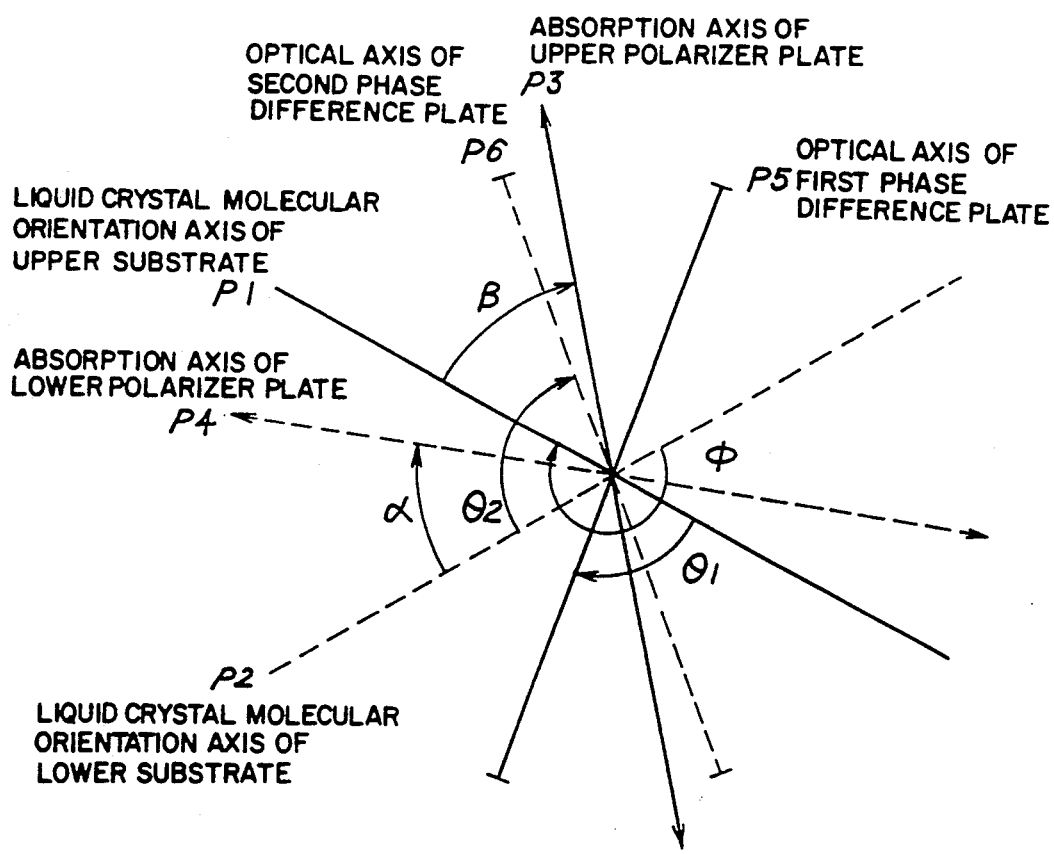
FIG. 2 is a plane view showing the configuration of the embodiment of the invention.

As shown in FIG. 17, the F-axis and S-axis of the STN liquid crystal panel are individually provided on the upper and lower substrates. When the phase difference plates are disposed so as to cancel the phase difference, it means that the phase difference plates are disposed so that the F-axis or S-axis may be orthogonal to the front side and back side across the STN liquid crystal panel. In other words, the angles $\theta_1$ and $\theta_2$ defined in FIG. 2 showing a plane view of an embodiment of the invention, are set at 90 degrees. At this time, when the retardation is equalized between the first phase difference plate and the second phase difference plate, the formula $Re2 = 2Re1\cos\theta$ induced from FIG. 13 may be employed. Thus, the optical design may be planned easily, and the production efficiency may be enhanced at the same time.

Incidentally, as for the phase decreasing action, it is not necessarily required to disposed orthogonally, and the canceling effect will be obtained if the intersection angle is over 45 degrees. In this invention, however, for the ease of optical design, by disposing the first and second phase difference plates symmetrically with respect to the STN liquid crystal panel, the relation of $\theta_1 = \theta_2 = 180$ degrees is defined.

Meanwhile, the state of the exit light in order to obtain black/white display should be, ideally, so that the phase difference by 0 or mm (m being an integer), in an OFF state (when nonselective waveform is applied). Further, the phase difference should be $(2m-1) \times \pi/2$ (m being an integer) in an ON state (when selective waveform is applied). The exit light is a linear polarization when the phase difference is 0 or $m\pi$. Further, the phase difference plate shows the ellipsoidal polarization at the maximum rate of ellipsis when the phase difference is $(2m-1) \times \pi/2$. The waveform dispersion in such an ideal state becomes as shown in FIG. 19.

Figure 19:
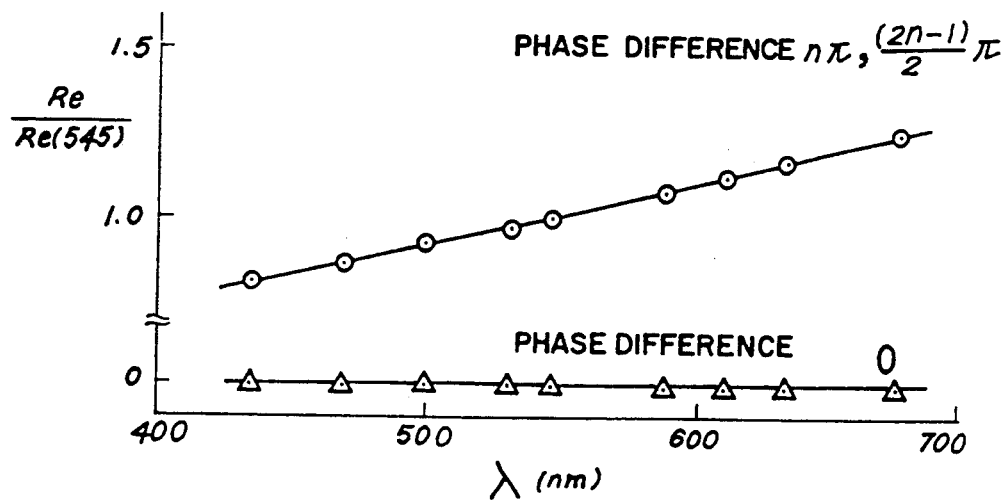
FIG. 19 is a diagram showing an ideal wavelength dispersion.

Therefore, by combining the wavelength dispersion of the STN liquid crystal panel (FIG. 18) and the waveform dispersion of the phase difference plate (FIG. 16), a perfect black/white display will be obtained when matched with the ideal waveform dispersion shown in FIG. 19.

Figure 20:
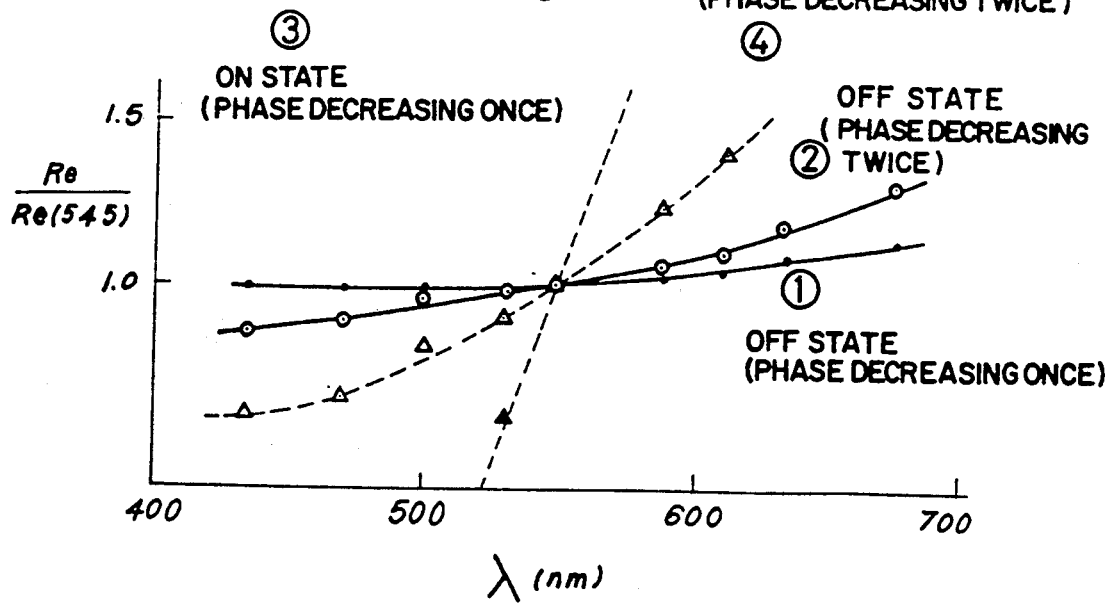
FIG. 20 is a diagram showing the phase decreasing action when the phase difference plates and STN liquid crystal panel are combined together.

The wavelength dispersion of the exit light when the invention is executed is shown in FIG. 20, in which it is known that the wavelength dispersion is closer to the profile in FIG. 19 when the phase decreasing action between the phase difference plate and STN liquid crystal panel is done twice (curves 2, 4), than when done only once (curves 1, 3). It means that the wavelength dispersion is closer to the ideal profile when the phase difference plates are disposed in front of and behind the STN liquid crystal panel, which is a characteristic of the invention, than when disposed at one side. As a result, compensating the phase difference in the whole wavelength region, the azimuth angles of the exit ellipsoidal polarization are aligned. Therefore, by optimizing the setting of the detectors, colorless display and high contrast may be achieved at the same time. (Practical examples are FIG. 3 and FIG. 4 which shown the exit ellipsoidal polarization state of Embodiment 1 described later).

It is, moreover, possible to approximate the wavelength dispersion to a more ideal wavelength dispersion by laminating a plurality of phase difference plates disposed on the front side and back side of the STN liquid crystal panel. In this case of lamination of a plurality, needless to say, the optimizing technique stated above is effective.

A practical embodiment of the invention is described below while referring to FIG. 1 and FIG. 2.

FIG. 1 is an explanatory drawing showing the structure of an embodiment of the invention described below, in which numeral 1 is an upper polarizer plate, 2 is a first phase difference plate, 3 is an STN liquid crystal panel, 4 is a second phase difference plate, and 5 is a lower polarizer plate. The upper polarizer plate 1 is made of a polarizer plate of neutral gray type with the independent transmittance of 42% and degree of polarization of 99.99%. The first phase difference plate 2 is made of a uniaxial polymer film (polycarbonate) in a thickness of 50 μm with the retardation value of 330 to 420 nm, and the STN liquid crystal panel 3 is a panel in which LC material containing a levorotatory chiral dopant is injected, being set at twist angle of 210 degrees and 240 degrees and d.Δn (d is the liquid crystal layer thickness, Δn is the refractive anisotropy)=0.82 to 0.92 μm. The second phase difference plate 4 was made of the material having the same retardation as the first phase difference plate 2 disposed at the front side, and the lower polarizer plates 5 was made of the same material as the upper polarizer plate 1. These layers were further laminated to compose a transmissive type liquid crystal display device.

The configuration of lamination of these constituent members is explained by referring to FIG. 2. Of the arrows shown in FIG. 2, P1 denotes the liquid crystal molecular orientation axis of the upper substrate composing the STN liquid crystal panel, P2 is the liquid crystal molecular orientation axis of the lower substrate, P3 is the absorption axis of the upper polarizer plate 1, P4 is the absorption axis of the lower polarizer plate 5, P5 is the optical axis (S-axis) of the first phase difference plate 2, P6 is the optical axis (S-axis) of the second phase difference plate, 4, $\theta_1$ is the angle formed by the liquid crystal molecular orientation axis P1 (S-axis) of the upper substrate and the optical axis P5 of the first phase difference plate, $\theta_2$ is the angle formed by the liquid crystal molecular orientation axis P2 (S-axis) of the lower substrate and the optical axis P6 of the second phase differencer plate, $\alpha$ is the angle formed by the liquid crystal molecular orientation axis P2 of the lower substrate and the absorption axis P4 of the lower polarizer plate, $\beta$ is the angle formed by the liquid crystal molecular orientation axis P1 of the upper substrate and the absorption axis P3 of the upper polarizer plate, and $\phi$ is the liquid crystal twist angle. In this invention, since the first phase difference plate 2 and the second phase difference plate 4 are symmetrically disposed, the condition of $\theta_1 + \theta_2 = 180°$ (constant) is defined.

EMBODIMENT 1

Using an STN liquid crystal panel with a twist angle of 240 degrees and a retardation value of 0.92 μm, the spectral transmittance was measured, and a spectral transmittance curve such as shown in FIG. 12 was obtained. From the wavelength λ60 for providing the maximum value of the transmitted light of this spectral transmittance curve, the effective retardation value of the STN liquid crystal panel was found to be Re (panel)=500 nm.

From FIG. 11, the retardation value Re1=(400) nm of the phase difference plate corresponding to the retardation value of this STN liquid crystal panel was selected, and further from Re2=Re (panel)×3/2 (n=1 or 2) and Re2=2Re1cos $\theta$, $\theta$=19°(n=1), 62°(n=2) were obtained.

Considering, from these results, as the first and second phase difference plates 2,4, those having the retardation value of Re1=400 nm were used, and the constituent members were set and disposed at $\theta_1 = 80°$, $\theta_2 = 100°$, $\alpha = 40°$, and $\beta = 50°$. In Embodiments 2 to 5, the constituent members are set and disposed in the same manner.

Figure 3:
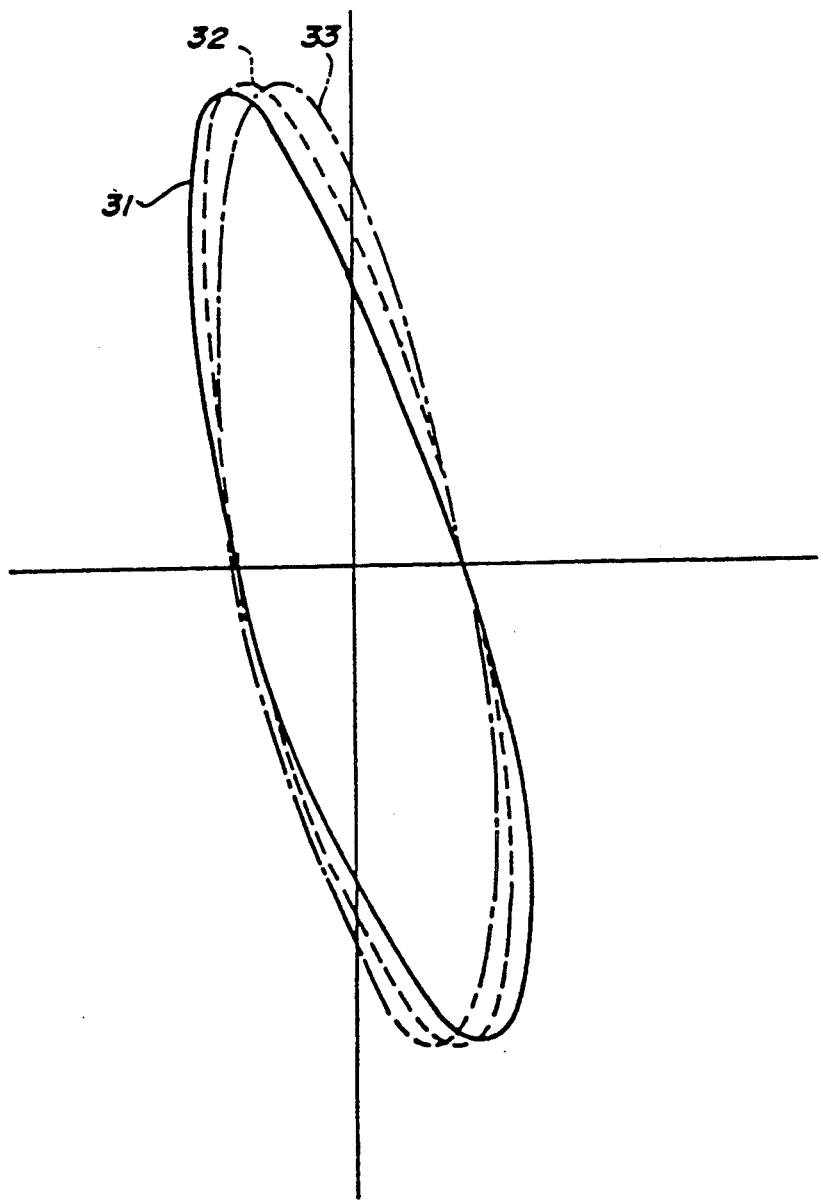
FIG. 3 is a diagram showing the exit polarization state passing through a first phase difference plate in an OFF state in Embodiment 1.
Figure 4:
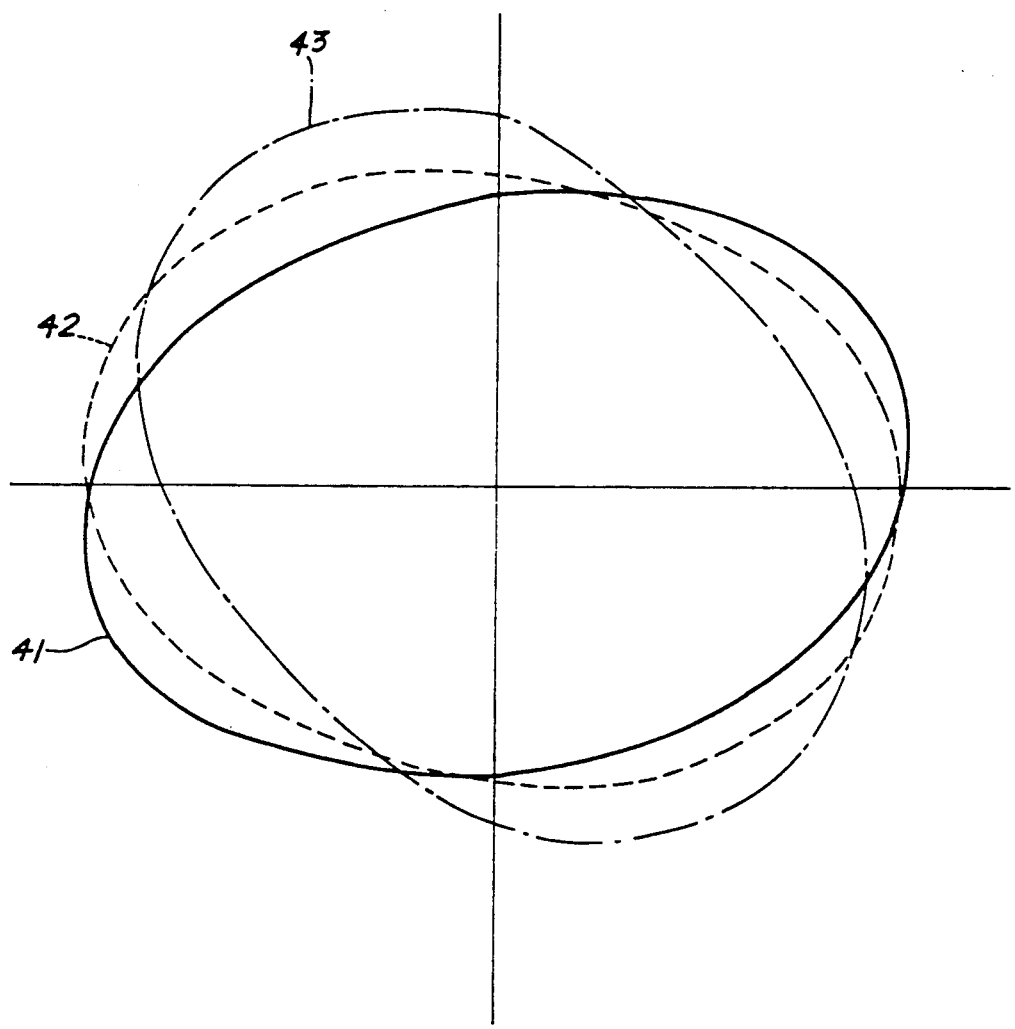
FIG. 4 is a diagram showing the exit polarization state passing through the first phase difference plate in an ON state in Embodiment 1.

FIG. 3 shows the exit polarization state of passing through the first phase difference plate 2 in an OFF state, and FIG. 4 shows the exit polarization state of passing through the first phase difference plate 2 in an ON state.

In FIG. 3, numeral 31 denotes the light at a wavelength of λ=450 nm, 32 is the light at a wavelength of λ=550 nm, and 33 is the light at wavelength of λ=650 nm. The directions of the principal axis of the ellipsoidal polarization nearly coincides with the absorption axis P3 of the upper polarizer plate 1 (black state). In FIG. 4, numerals 41, 42, 43 are the lights at wavelength of λ=450, 550, 650 nm, same as in FIG. 3, in the ellipsoidal polarization state, and the principal axis is formed in the direction orthogonal to the absorption axis P3, and a high transmittance is obtained (white state).

As a result of evaluation in the driving condition of 1/200D, 1/13B, the OFF transmittance was 0.2% and the ON transmittance was 24.1%, and a contrast ratio of 120:1 was obtained.

EMBODIMENT 2

As the first and second phase difference plates 2, 4, those having the retardation value of 385 nm were used, and the STN liquid crystal panel 3 with d.Δn of 0.86 μm and twist angle of 240 degrees was used. The constituent members were set and disposed at $\theta_1 = 75°$, $\theta_2 = 106°$, $\alpha = 45°$, $\beta = 45°$.

Figure 5:
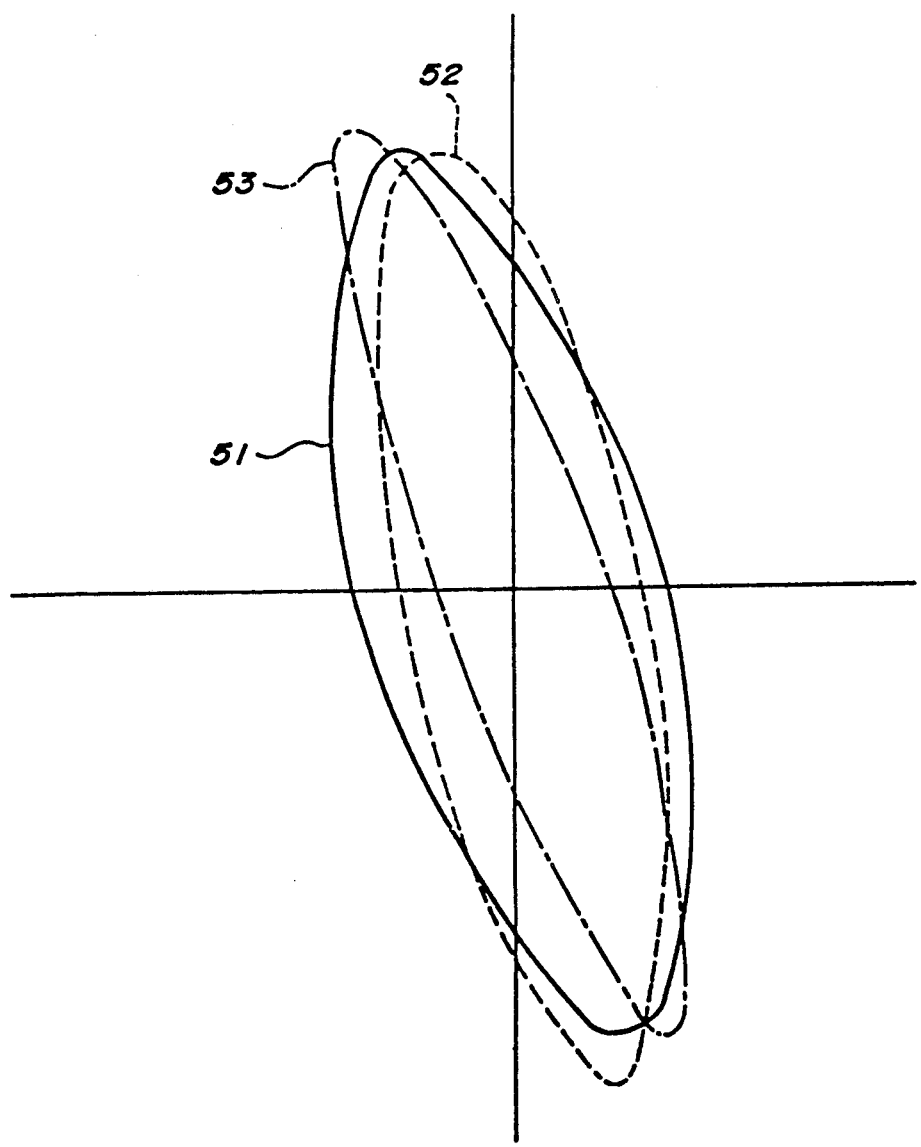
FIG. 5 is a diagram showing the exit polarization state passing through the first phase difference plate in an OFF state in Embodiment 2.
Figure 6:
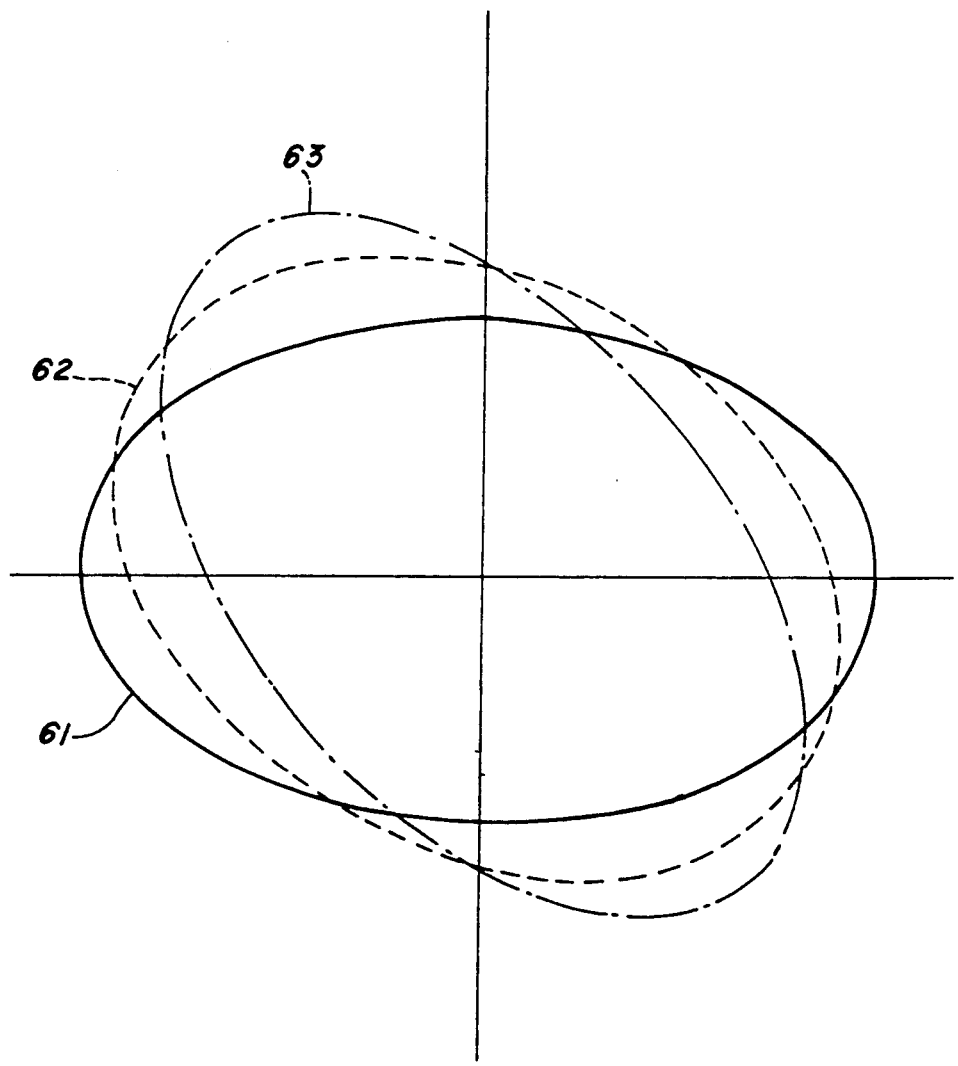
FIG. 6 is a diagram showing the exit polarization state passing through the first phase difference plate in an OFF state in Embodiment 2.

FIG. 5 shows the exit polarization state of passing through the first phase difference plate 2 in an OFF state, and FIG. 6 shows the exit polarization state of passing through the first phase difference plate 2 in an ON state.

Figure 7:
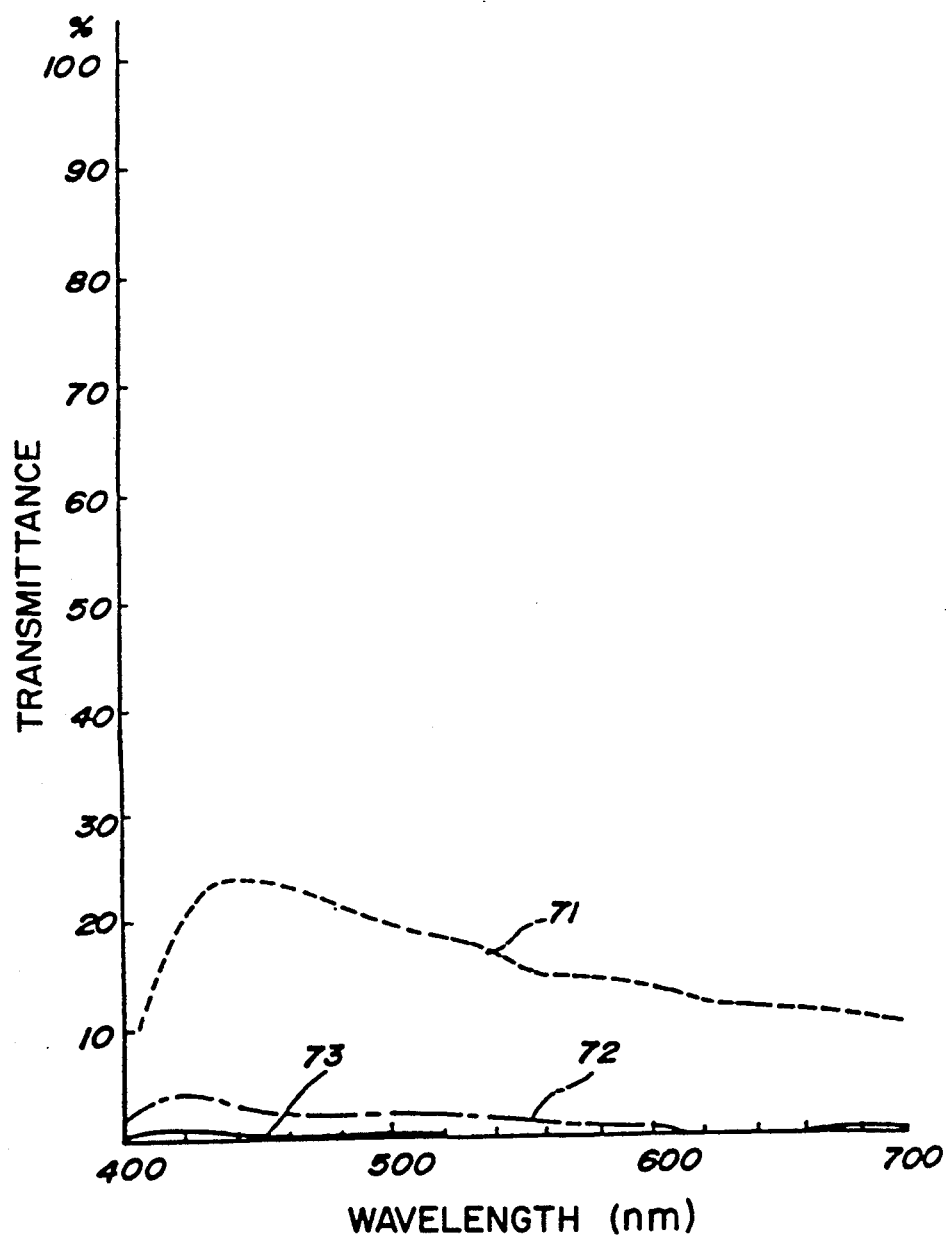
FIG. 7 is a diagram showing the ON/OFF spectral characteristic in Embodiment 2.

In FIG. 5, numeral 51 denotes the light at wavelength of λ=450 nm, 52 is the light at wavelength of λ=550 nm, and 53 is the light at wavelength of λ=650 nm, and the direction of the principal axis of the ellipsoidal polarization nearly coincide with the absorption axis P3 of the upper polarizaer plate 1 (black state). In FIG. 6, numerals 61, 62, 63 are the lights at wavelength of λ=450, 550, 650 nm, the same as in FIG. 5, in the ellipsoidal polarization state, and the principal axis is formed nearly in the direction orthogonal to the absorption axis P3. Since the ellipticity is large, a high transmittance in colorless display is achieved (white state). The spectral characteristic diagram of this exit light is shown in FIG. 7, in which numeral 71 denotes the ON state, 72 shows the no voltage applied state, and 73 is the OFF state. FIG. 7 expresses the high transmittance in the ON state, low transmittance in the OFF state, and flat spectral characteristic.

According to the result of evaluation in the driving condition of 1/200D, 1/13B, the OFF transmittance of 0.5%, the ON transmittance of 18.6%, and the contrast ratio of 37:1 were obtained.

EMBODIMENT 3

As the first and second phase difference plates 2, 4, those having the retardation value of 350 nm were used, and the STN liquid crystal panel 3 with d.Δn of 0.82 μm and twist angle of 240 degrees was used. The constituent members were set and disposed at $\theta_1 = 75°$, $\theta_2 = 105°$, $\alpha = 45°$, $\beta = 45°$.

Figure 8:
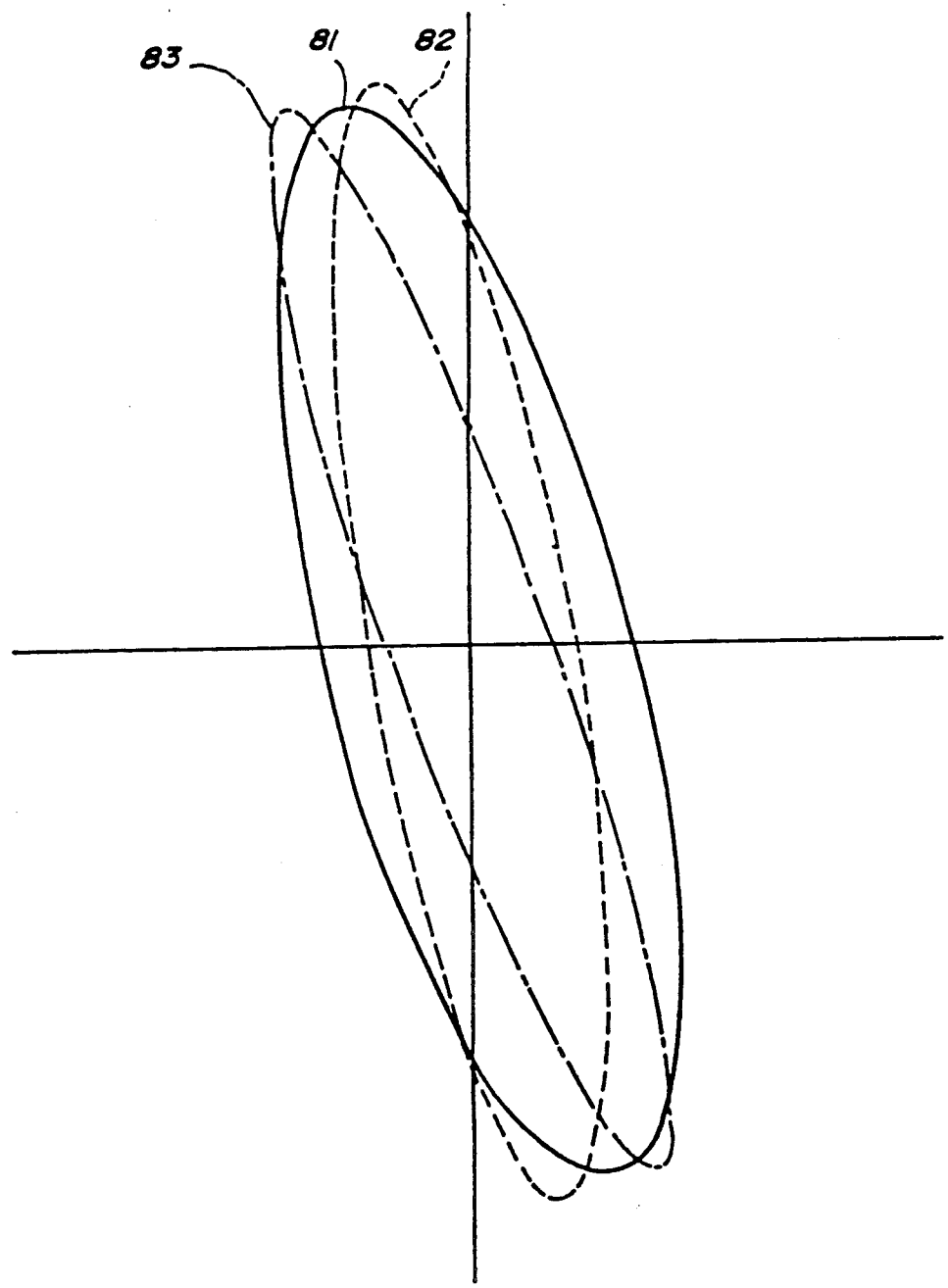
FIG. 8 is a diagram showing the exit polarization state passing through the first phase difference plate in an OFF state in Embodiment 3.
Figure 9:
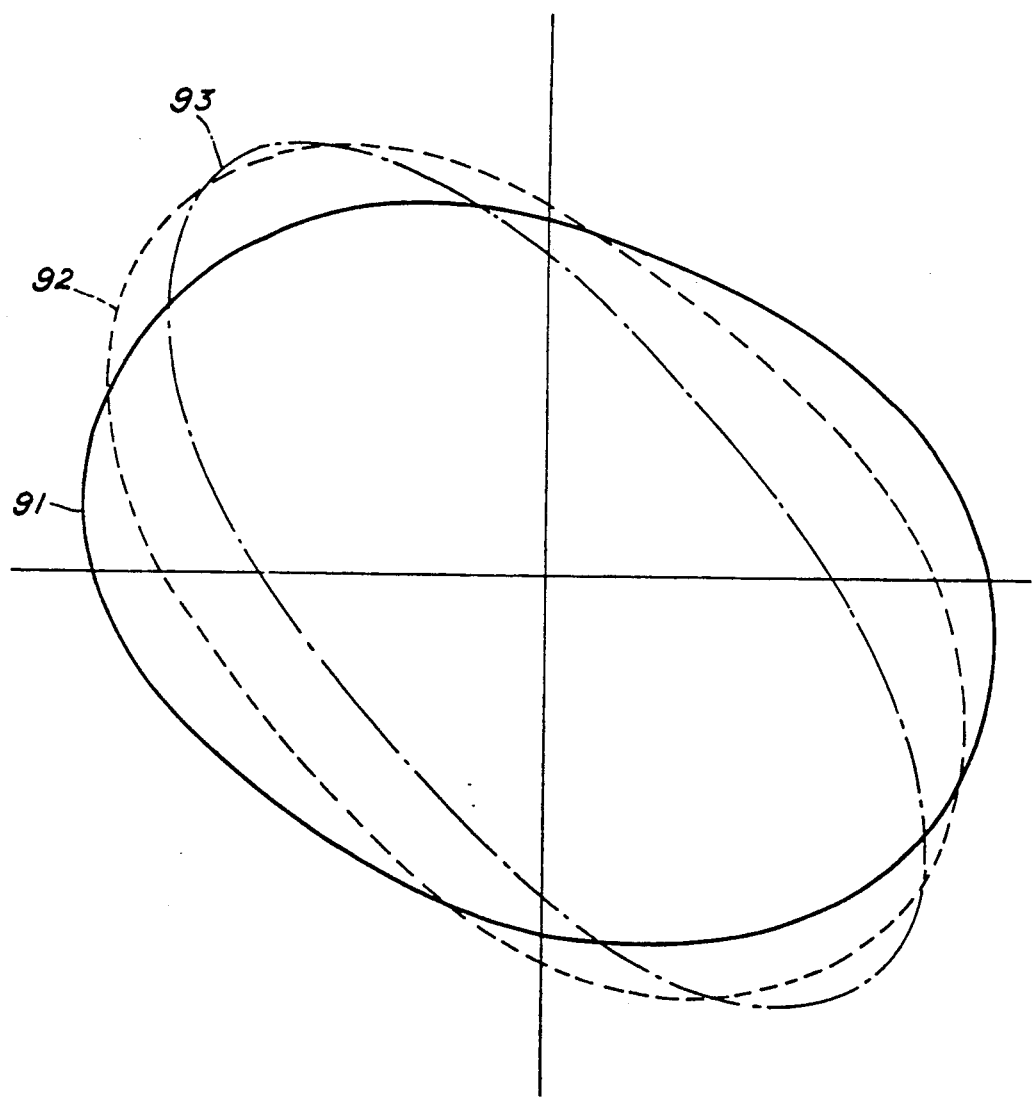
FIG. 9 is a diagram showing the exit polarization state passing through the first phase difference plate in an ON state in Embodiment 3.

FIG. 8 shows the exit polarization state of passing through the first phase difference plate 2 in an OFF state, and FIG. 9 shows the exit polarization state of passing through the first phase difference plate 2 in an ON state. In FIG. 8, numeral 81 denotes the light at wavelength of λ=450 nm, 82 is the light at wavelength of λ=550 nm, and 83 is the light at wavelength of λ=650 nm, and the directions of the principal axis of the ellipsoidal polarization are nearly matched with the absorption axis P3 of the upper polarizer plate 1 (black state). In FIG. 9, numerals 91, 92, 93 denote the lights at wavelength of λ=450, 550, 650 nm, same as 81, 82, 83 in FIG. 8, in the ellipsoidal polarization state. Further, the principal axis is nearly close to the direction orthogonal to the absorption axis P3, and a high transmittance in colorless display is achieved (white state).

As a result of evaluation in the driving condition of 1/200D, 1/13B, a contrast ratio of 24:1 was obtained at the OFF transmittance of 0.6%, and the ON transmittance of 14.4%.

EMBODIMENT 4

The first and second phase difference plates 2, 4 were made of those having the retardation value of 385 nm, and the STN liquid crystal panel 3 had d.Δn of 0.91 μm and twist angle of 210 degrees. The constituent members were set and disposed at $\theta_1 = 90°$, $\theta_2 = 90°$, $\alpha = 30°$, $\beta = 60°$.

As a result of evaluation in the driving condition of 1/200D, 1/13B, a contrast ratio of 24:1 was obtained at the OFF transmittance of 0.5% and the ON transmittance of 12.1%.

EMBODIMENT 5

The first and second phase difference plates 2, 4 were made of those having the retardation value of 350 nm, and the STN liquid crystal panel 3 had d.$\Delta$n of 0.83 $\mu$m and twist angle of 210 degrees. The constituent members were set and disposed at $\theta_1=90°$, $\theta_2=90°$, $\alpha=30°$, $\beta=60°$.

As a result of evaluation in the driving condition of 1/200D, 1/13B, a contrast ratio of 18:1 was obtained at the OFF transmittance of 0.6% and ON the transmittance of 11.0%.

Figure 14:
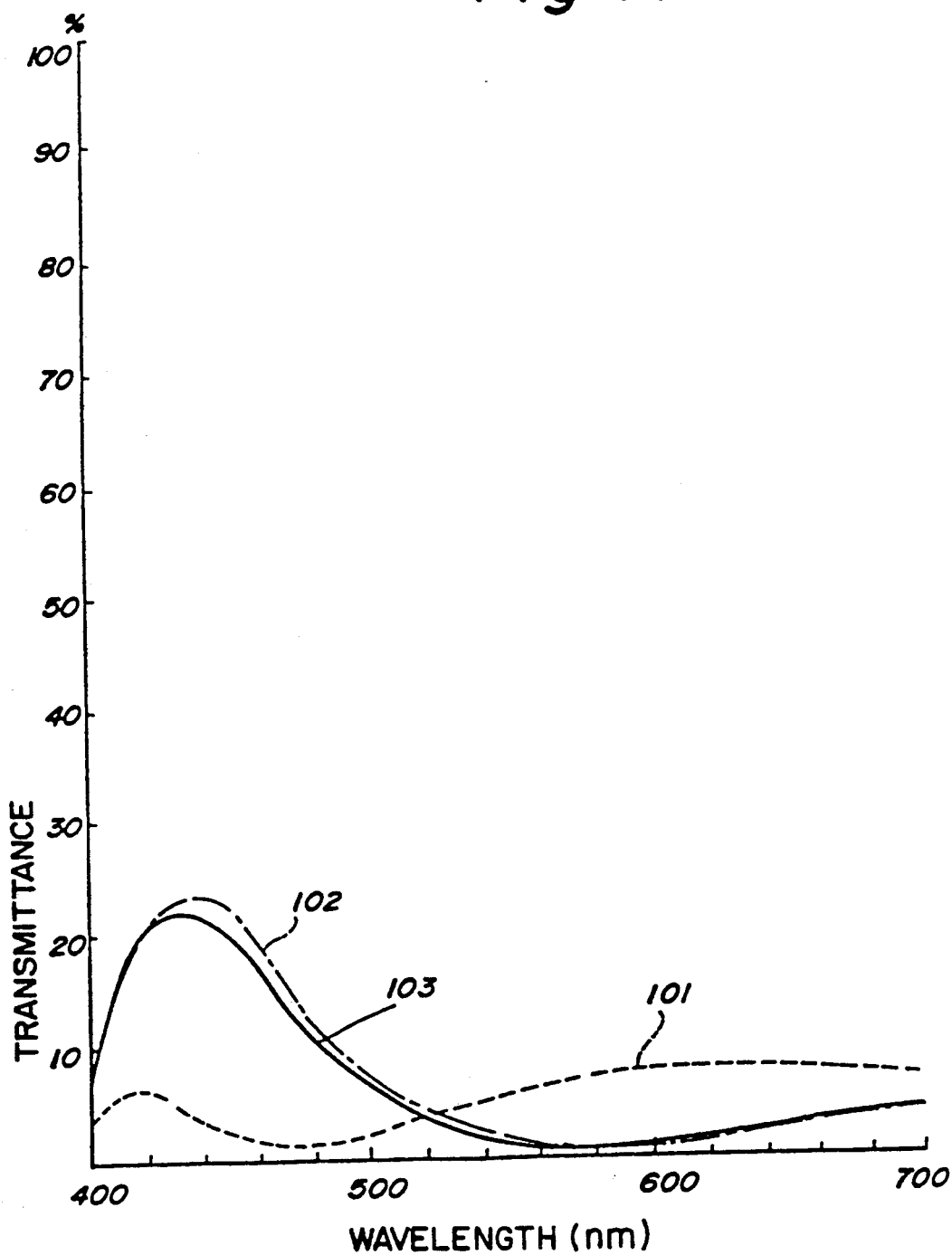
FIG. 14 is a diagram showing the spectral characteristic of a conventional device.

By way of comparison, the spectral characteristic diagram of Embodiment 21 disclosed in the prior art published as the Japanese Laid-open Patent 64-519 is shown in FIG. 14. In this diagram, numeral 101 denotes the ON state, 102 shows the no application state, and 103 is the the OFF state. The transmittance is high in OFF state, low in the ON state, and the spectral characteristic is not flat, and therefore a favorable black/white state is not obtained. The contrast ratio was only about 4:1.

Table 1 compares the contrast ratio between the conventional liquid crystal display devices presented as reference examples (1) and (2), and the embodiments of the liquid crystal display devices of the invention.

TABLE 1

| | Driving condition: 1/200D, 1/13B | | | | | | |
|---|---|---|---|---|---|---|---|
| | Embodiment 1 | Embodiment 2 | Embodiment 3 | Embodiment 4 | Embodiment 5 | Reference (1) | Reference (2) |
| Twist angle | 240° | 240° | 240° | 210° | 210° | 240° | 240° |
| Retardation value of phase difference plate | 400 nm | 385 nm | 350 nm | 385 nm | 350 nm | 335 nm | 350 nm |
| Angle formed by 1st, 2nd phase difference plates and optical axis | 40° | 30° | 30° | 30° | 30° | 20° | 30° |
| d · $\Delta$n of liquid crystal panel | 0.92 $\mu$m | 0.86 $\mu$m | 0.82 $\mu$m | 0.91 $\mu$m | 0.83 $\mu$m | 0.82 $\mu$m | 0.86 $\mu$m |
| OFF transmittance | 0.2% | 0.5% | 0.6% | 0.5% | 0.6% | 0.6% | 0.9% |
| ON transmittance | 24.1% | 18.6% | 14.4% | 12.1% | 11.0% | 12.0% | 16.2% |
| Max. contrast ratio (ON/OFF) | 120:1 | 37:1 | 24:1 | 24:1 | 18:1 | 20:1 | 18:1 |

As shown in Embodiments 1 to 5, in the invention, the thickness and weight may be reduced as compared with the two-layer type STN-LCD, and the contrast ratio is also higher. When compared with the conventional phase difference plate system STN (Embodiment 21 in the Japanese Laid-open Patent 64-519), by disposing the phase difference plates of the same retardation value as in the invention, symmetrically, at the front side and back side ($\theta_1+\theta_2=180°$), it is known that a sharp black/white display may be obtained at a higher contrast ratio. As shown in Embodiments 1 to 5, in order to obtain a sharp black/white display at a high ON transmittance while keeping a high contrast over the two-layer type STN-LCD, the desired retardation value of the phase difference plates should be 330 to 500 nm, or more preferably 330 to 420 nm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device, including a sequentially laminated upper polarizer plate, a first phase difference plate, a supertwisted nematic (STN) liquid crystal panel, a second phase difference plate, and a lower polarizer plate, wherein retardation values of the first phase difference plate and the second phase difference are equal, and the first phase difference plate and the second phase difference plate are symmetrically disposed in front and behind the STN liquid crystal panel, respectively, in the relation of $\theta_1+\theta=180°$, wherein $\theta_1$ is the angle formed by a liquid crystal molecular orientation axis of an upper substrate of the STN liquid crystal panel and an optical axis of the first phase difference plate, and $\theta_2$ is the angle formed by liquid crystal molecular orientation axis of a lower substrate of the STN liquid crystal panel and a lower substrate of the STN liquid crystal panel and an optical axis of the second phase difference plate.

2. A liquid crystal display device according to claim 1, wherein the retardation values of the first phase difference plate and the second phase difference plate are within the range of 300 to 500 nm.

3. A liquid crystal display device according to claim 1, wherein the retardation values of the first phase difference plate and the second phase difference plate are within the range of 330 to 420 nm.

4. A liquid crystal display device according to claim 1, wherein both $\theta_1$ and $\theta_1$ and $\theta_2$ are greater than 45°.

5. A liquid crystal display device according to claim 1, wherein both $\theta_1$ and $\theta_2$ are 90°.

6. A liquid crystal display device according to claim 1, wherein the first phase difference plate and the second phase difference plate are respectively composed of a single or plural uniaxial polymer film.

7. A liquid crystal display device according to claim 1, wherein the liquid crystal display device includes an STN liquid crystal panel of a predetermined twist angle and retardation value (Re (panel)), the retardation values of the first phase difference plate and the second phase difference plate are Re1 individually, the effective retardation values due to the first phase difference plate and the second phase difference plate are Re2, and the angle formed by the optical axes of the first phase difference plate and the second phase difference plate are $\theta$, an approximate value of Re1 is predetermined, and from nRe2 = Re (panel) × 3/2 (n = 1 or 2), an approximate value of Re2 is calculated, and from Re2 = 2 Re1cos $\theta$, an approximate value of $\theta$ is calculated, and accordingly the first phase difference plate and the second phase difference plate are disposed.

* * * * *

UNITED STATES PATENT AND TRADEMARK OFFICE
CERTIFICATE OF CORRECTION

PATENT NO. : 5,089,906

DATED : February 18, 1992

INVENTOR(S) : Kiroshi OHNISHI et al.

It is certified that error appears in the above-identified patent and that said Letters Patent is hereby corrected as shown below:

In column 12, line 4, change "second phase difference" to
--second phase difference plate--

In column 12, line 8, change the equation "$\theta_1+\theta=180°$" to --$\theta_1+\theta_2=180°$--

In column 12, lines 14-15, delete the phrase "and a lower substrate of the STN liquid crystal panel"

In column 12, line 26, delete the phrase "and $\theta_1$"

Signed and Sealed this

Twenty-third Day of May, 1995

Attest:

BRUCE LEHMAN

Attesting Officer          Commissioner of Patents and Trademarks